United States Patent
Zyzdryn (10) Patent No.: US 7,277,562 B2
(45) Date of Patent: Oct. 2, 2007

(54) BIOMETRIC IMAGING CAPTURE SYSTEM AND METHOD

(75) Inventor: Gregory Zyzdryn, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 963 days.

(21) Appl. No.: 10/631,890

(22) Filed: Aug. 1, 2003

(65) Prior Publication Data

US 2005/0025344 A1 Feb. 3, 2005

(51) Int. Cl.
*G06K 9/00* (2006.01)

(52) U.S. Cl. ............... 382/124; 382/115; 382/103; 382/112

(58) Field of Classification Search .......... 382/124, 382/115, 116
See application file for complete search history.

(56) References Cited

U.S. PATENT DOCUMENTS

| | | | |
|---|---|---|---|
| 2,500,017 A | 3/1950 | Altman | |
| 3,200,701 A | 8/1965 | White | |
| 3,475,588 A | 10/1969 | McMaster | |
| 3,482,498 A | 12/1969 | Becker | |
| 3,495,259 A | 2/1970 | Rocholl et al. | |
| 3,527,535 A | 9/1970 | Monroe | |
| 3,540,025 A | 11/1970 | Levin et al. | |
| 3,617,120 A | 11/1971 | Roka | |
| 3,699,519 A | 10/1972 | Campbell | |
| 3,743,421 A | 7/1973 | Maloney | |
| 3,906,520 A | 9/1975 | Phillips | |
| 3,944,978 A | 3/1976 | Jensen et al. | |
| 3,947,128 A | 3/1976 | Weinberger et al. | |

(Continued)

FOREIGN PATENT DOCUMENTS

EP 0 101 772 A1 3/1984

(Continued)

OTHER PUBLICATIONS

Btt (Biometric Technology Today), Finger technologies contacts, 2 pages, date unknown (believed to be obtained before one year prior to Aug. 1, 2003).

(Continued)

*Primary Examiner*—Joseph Mancuso
*Assistant Examiner*—Jonathan Schaffer
(74) *Attorney, Agent, or Firm*—Sterne, Kessler, Goldstein & Fox P.L.L.C.

(57) ABSTRACT

A method of reliably capturing biometric print images includes determining the print quality of a scanned image, detecting prints in the scanned image, and determining whether the scanned image is ready for capture. The method includes filtering the scanned image, binarizing the filtered image, detecting print area, print contrast, and print shape of the binarized image, and separating the print image into individual print images based on the print area, contrast, and shape. Each individual print image is classified base on a predetermined quality threshold and a quality classification of each individual print image is indicated. The method includes a predetermined capture delay time period, quality time period, and scanner timeout period. An operator can annotate issues regarding missing or unacceptable print images. A system of reliably capturing biometric print images includes a scanner including a print capture manager, a computer, and a communication link between the computer and scanner.

31 Claims, 8 Drawing Sheets

U.S. PATENT DOCUMENTS

| | | |
|---|---|---|
| 3,968,476 A | 7/1976 | McMahon |
| 3,975,711 A | 8/1976 | McMahon |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,336,998 A | 6/1982 | Ruell |
| 4,358,677 A | 11/1982 | Ruell et al. |
| 4,414,684 A | 11/1983 | Blonder |
| 4,537,484 A | 8/1985 | Fowler et al. |
| 4,544,267 A | 10/1985 | Schiller |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,096,290 A | 3/1992 | Ohta |
| 5,131,038 A | 7/1992 | Puhl et al. |
| 5,146,102 A | 9/1992 | Higuchi et al. |
| 5,157,497 A | 10/1992 | Topper et al. |
| 5,177,353 A | 1/1993 | Schiller |
| 5,185,673 A | 2/1993 | Sobol |
| 5,187,747 A | 2/1993 | Capello et al. |
| 5,210,588 A | 5/1993 | Lee |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A | 8/1996 | Giles et al. |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A | 4/1997 | Ranalli et al. |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,726,443 A | 3/1998 | Immega et al. |
| 5,729,334 A | 3/1998 | Van Ruyven |
| 5,736,734 A | 4/1998 | Marcus et al. |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A | 10/1998 | Wong |
| 5,825,005 A | 10/1998 | Behnke |
| 5,825,474 A | 10/1998 | Maase |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,926,555 A | 7/1999 | Ort et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,731 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A | 12/1999 | Whitehead et al. |
| 6,000,224 A | 12/1999 | Foye |
| 6,018,739 A | 1/2000 | McCoy et al. |
| 6,023,522 A | 2/2000 | Draganoff et al. |
| 6,038,332 A | 3/2000 | Fishbine et al. |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |
| 6,064,779 A | 5/2000 | Neukermans et al. |
| 6,072,891 A | 6/2000 | Hamid et al. |
| 6,075,876 A | 6/2000 | Draganoff |
| 6,078,265 A | 6/2000 | Bonder et al. |
| 6,088,585 A | 7/2000 | Schmitt et al. |
| 6,097,873 A | 8/2000 | Filas et al. |
| 6,104,809 A | 8/2000 | Berson et al. |

| | | | |
|---|---|---|---|
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,154,285 A | 11/2000 | Teng et al. | |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |
| 6,198,836 B1 | 3/2001 | Hauke | |
| 6,204,331 B1 | 3/2001 | Sullivans et al. | |
| 6,240,200 B1 | 5/2001 | Wendt et al. | |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,282,302 B1 | 8/2001 | Hara | |
| 6,327,047 B1 | 12/2001 | Motamed | |
| 6,347,163 B2 | 2/2002 | Roustaei | |
| 6,355,937 B2 | 3/2002 | Antonelli et al. | |
| 6,404,904 B1 | 6/2002 | Einighammer et al. | |
| 6,414,749 B1 | 7/2002 | Okamoto et al. | |
| 6,444,969 B2 | 9/2002 | Johnson | |
| 6,485,981 B1 | 11/2002 | Fernandez | |
| 6,643,390 B1 | 11/2003 | Clark et al. | |
| 7,174,036 B2 * | 2/2007 | Ohba | 382/124 |
| 2001/0036301 A1 | 11/2001 | Yamaguchi et al. | |
| 2002/0030668 A1 | 3/2002 | Hoshino et al. | |
| 2002/0106115 A1 | 8/2002 | Rajbenbach et al. | |
| 2003/0012417 A1 | 1/2003 | Hamid | |
| 2003/0089703 A1 | 5/2003 | Carver et al. | |
| 2003/0133103 A1 | 7/2003 | Arnold et al. | |
| 2003/0133143 A1 | 7/2003 | McClurg et al. | |
| 2003/0142856 A1 | 7/2003 | McClurg et al. | |
| 2007/0014440 A1 * | 1/2007 | Lo | 382/124 |

FOREIGN PATENT DOCUMENTS

| | | |
|---|---|---|
| EP | 0 308 162 A2 | 3/1989 |
| EP | 0 308 162 A3 | 3/1989 |
| EP | 0 379 333 A1 | 7/1990 |
| EP | 0 623 890 A2 | 11/1994 |
| EP | 0 623 890 A3 | 11/1994 |
| EP | 0 650 137 A2 | 4/1995 |
| EP | 0 650 137 A3 | 4/1995 |
| EP | 0 653 882 A1 | 5/1995 |
| EP | 0 379 333 B1 | 7/1995 |
| EP | 0 889 432 A2 | 1/1999 |
| EP | 0 889 432 A3 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 A | 9/1987 |
| JP | 63-137206 A | 6/1988 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| SU | 1769854 A1 | 10/1992 |
| WO | WO87/02491 A1 | 4/1987 |
| WO | WO90/03620 A1 | 4/1990 |
| WO | WO92/11608 A1 | 7/1992 |
| WO | WO94/22371 A2 | 10/1994 |
| WO | WO94/22371 A3 | 10/1994 |
| WO | WO96/17480 A2 | 6/1996 |
| WO | WO96/17480 A3 | 6/1996 |
| WO | WO97/29477 A1 | 8/1997 |
| WO | WO97/41528 A1 | 11/1997 |
| WO | WO98/09246 A1 | 3/1998 |
| WO | WO98/12670 A1 | 3/1998 |
| WO | WO99/12123 A1 | 3/1999 |
| WO | WO99/26187 A1 | 5/1999 |
| WO | WO99/40535 A1 | 8/1999 |

OTHER PUBLICATIONS

Drake, M.D. et al., "Waveguide hologram fingerprint entry device," *Optical Engineering*, vol. 35, No. 9, Sep. 1996, pp. 2499-2505.

Roethenbaugh, G. (ed.), *Biometrics Explained*, 1998, ICSA, pp. 1-34.

*Automated Identification Systems* (visited May 20, 1999) <http://www.trw.com/idsystems/bldgaccess2.html>, 1 page, Copyright 1999.

*Ultra-Scan Corporation Home Page* (visited May 20, 1999) <http://www.ultra-scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID-Card System Technical Specifications* (last updated Jul. 18, 1998) <http://dermalog.de/Britain/Products/ID-Card/idcard2.htm>, 2 pages.

*Fujitsu Limited Products and Services* (updated Apr. 21, 1999) <http://www.fujitsu.co.jp/hypertext/Products/index-e.html>, 3 pages, Copyright 1995-1999.

*SonyDCam* (visited May 20, 1999) <http://www.microsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG-40* (visited May 18, 1999) <http://www.startek.com.tw/product/fg40/fg40.html>, 3 pages.

*SAC Technologies Showcases Stand-Alone SAC-Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25-26.

*Mytec Technologies Gateway* (visited Apr. 27, 1999) <http://www.mytec.com/Products/Gateway/>, 1 page.

*Mytec Technologies Gateway: Features & Benefits* (visited Apr. 27, 1999) <http://www.mytec.com/Products/Gateway/features.htm>, 1 page.

*Mytec Technologies Touchstone Pro* (visited Apr. 27, 1999) <http://www.mytec.com/Products/Touchstone/>, 1 page.

*Mytec Technologies Touchstone Pro: Features* (visited Apr. 27, 1999) <http://www.mytec.com/Products/Touchstone/features.htm>, 1 page.

*Electronic Timelock Systems and Biometric Readers* (last updated Apr. 17, 1999) <http://www.ifs-hr-bene.com/tclocks.html>, 1 page.

*Fingerprint Time Clock* (visited May 17, 1999) <http://www.lfs-hr-bene.com/Biometrics/Fingerprintclock.html>, 6 pages.

*KC-901: The KSI fingerprint sensor* (visited May 17, 1999) <http://www.kinetic.bc.ca/kc-901.html>, 3 pages.

*INTELNET Inc.* (visited May 20, 1999) <http://www.intelgate.com/index.html>, 1 page, Copyright 1996.

*Ver-i-Fus Fingerprint Access Control System* (visited May 20, 1999) <http://www.intelgate.com/verifus.htm>, 2 pages. (Ver-i-fus product released in 1995).

*Ver-i-fus® Configurations* (visited May 20, 1999) <http://www.intelgate.com/verconfig.htm>, 1 page. (Ver-i-fus product released in 1995).

*Ver-i-Fus® & Ver-i-Fus$^{mil®}$*(visited May 20, 1999) <http://www.intelgate.com/vif_data.htm>, 3 pages. (Ver-i-fus product released in 1995).

*Access Control System Configurations* (visited May 20, 1999) <http://www.intelgate.com/access.htm>, 2 pages. (Ver-i-fus product released in 1995).

*Company* (visited May 17, 1999) <http://www.instainfo.com/company.htm>, 2 pages.

*TouchLock™ II Fingerprint Identity Verification Terminal* (visited May 17, 1999) <http://www.identix.com/TLock.htm>, 4 pages.

*Physical Security and Staff Tracking Solutions* (visited May 17, 1999) <http://www.identix.com/products/biosecurity.html>, 3 pages, Copyright 1996-1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand-Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201-203.
*The DERMALOG Check-ID* (visited Nov. 12, 1999) <http://www.dermalog.de/ganzneu/products_check.html>, 1 page.
*Check-ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
*Time is Money?* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs-jena.com/ls1.htm>, 6 pages, Copyright 1998.
*Welcome to the Homepage of Heimann Biometric Systems GMBH* (visited Jun. 4, 1998) <http://www.hbs-jena.com/>, 1 page, Copyright 1998.
*Heimann Biometric Systems Corporate Overview* (visited Jun. 4, 1998) <http://www.hbs-jena.com/company.htm>, 4 pages, Copyright 1998.
*Remote Access Positive IDentification—raPID* (visited Jun. 3, 1998) <http://www.nec.com/cgi-bin/showproduct.exe?pro...emote+Access+Positive+IDentification+%2D+raPID>, 2 pages, Copyright 1997.
*Mòrpho DigiScan Cellular* (visited Jun. 3, 1998) <http://www.morpho.com/products/law_enforcement/digiscan/cellular.htm>, 2 pages, Copyright 1998.
*A.F.I.S.* (last updated Apr. 2, 1998) <http://www.dermalog.de/afis.htm>, 2 pages.
*Morpho FlexScan™ Workstation* (visited Jun. 3, 1998) <http://www.morpho.com/products/law_enforcement/flexscan/>, 2 pages, Copyright 1998.
True-ID® The LiveScan with special "ability". . . , 2 pages, date unknown (believed to be obtained before one year prior to Aug. 1, 2003).
*Printrak International: User List* (visited Jun. 3, 1998) <http://www.printrakinternational.com (and links)>, 10 pages, Copyright 1996.
*Live-Scan Products: Tenprinter®1133S* (visited Apr. 23, 1999) <http://www.digitalbiometrics.com/Products/tenprinter.htm>, 4 pages. (Tenprinter 1133S released in 1996).
*TouchPrint® 600 Live-Scan System* (visited Apr. 23, 1999) <http://www.identix.com/products/livescan.htm>, 4 pages, Copyright 1996-1998.
Systems for Live-Scan Fingerprinting, Digital Biometrics, Inc., 8 pages, Copyright 1998.
DBI FingerPrinter CMS™, Digital Biometrics, Inc., 5 pages. (CMS™ released in 1998).
Fingerscan V20, Identix Incorporated, 1 page, Copyright 1999.
Verid® Fingerprint Reader, TSSI, 4 pages, date unknown (believed to be obtained before one year prior to Aug. 1, 2003).
Response to Request for Information, Cross Match Technologies, Inc., 13 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4-en/empreinte-dig-en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live-Scan Products: Digital Biometrics TENPRINTER®* (visited Nov. 17, 1999) <http://www.digitalbiometrics.com/products/tenprinter.htm>, 4 pages. (Tenprinter released in 1996).
*DBL Live-Scan Products: Networking Options* (visited Nov. 17, 1999) <http://www.digitalbiometrics.com/products/networking_options.htm>, 3 pages.
*DBL Live-Scan Products: Digital Biometrics FingerPrinter CMS™* (visited Nov. 17, 1999) <http://www.digitalbiometrics.com/products/FingerPrinterCMS.htm>, 3 pages. (CMS™ released in 1998).
*DBI Live-Scan Products: Image Printer Stations* (visited Nov. 17, 1999) <http://www.digitalbiometrics.com/products/imageprinter.htm>, 2 pages.
*DBI Live-Scan Products: FC-21™ Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra-scan.com/400.htm>, 3 pages. (Scanner released in 1996).
*USC Scanner Design* (visited Nov. 17, 1999) <http://www.ultra-scan.com/scanner.htm>, 4 pages. (Scanner released in 1996).
*Series 500/600 Scanners* (visited Nov. 17, 1999) <http://www.ultra-scan.com/500.htm>, 3 pages. (Scanner released in 1996).
*Series 700 ID Station* (visited Nov. 17, 1999) <http://www.ultra-scan.com/700.htm>, 3 pages. (Scanner released in 1998).
*Identix: The Corporation* (visited Nov. 17, 1999) <http://www.identix.com/corporate/home.htm>, 2 pages, Copyright 1996-1998.
*Biometric Imaging Products* (visited Nov. 17, 1999) <http://www.identix.com/products/bioimage.htm>, 1 page, Copyright 1996-1998.
*TouchPrint™ 600 Live-Scan System* (visited Apr. 23, 1999) <http://www.identix.com/products/livescan.htm>, 4 pages, Copyright 1996-1998.
*TouchPrint™ 600 Palm Scanner* (visited Nov. 17, 1999) <http://www.identix.com/products/palmscan.htm>, 3 pages, Copyright 1996-1998.
*TouchPrint™ 600 Card Scan System* (visited Nov. 17, 1999) <http://www.identix.com/products/cardscan.htm>, 3 pages, Copyright 1996-1998.
*Dermalog Key—The safest and easiest way of access control* (last updated Jul. 18, 1998) <http://www.dermalog.de/Britain/Products/Key/key.htm>, 1 page.
*Dermalog Finger-Id Your small size solution for high security* (last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main-FPB.html>, 1 page.
*Fingerprint Biometrics: Securing The Next Generation*, May 19, 1999, (visited Nov. 17, 1999) <http://www.secugen.com/pressrel.htm>, 2 pages.
*SecuGen Unveils Fully Functional Fingerprint Recognition Solutions*, May 11, 1999, (visited Nov. 17, 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999) <http://www.iosoftware.com/biosols/sony/fiu/applications/fit100.htm>, 2 pages.
*Sony Fingerprint Identification Unit (FIU-700)* (visited Nov. 17, 1999) <http://www.iosoftware.com/biosols/sony/fiu70/index.htm>, 2 pages. (Unit available late 1999).
*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI-550)* (visited Nov. 17, 1999) <http://www.iosoftware.com/biosols/fujitsu/fpi550.htm>, 2 pages.

*Mitsubishi MyPass LP-1002* (visited Nov. 17, 1999) <http://www.iosoftware.com/biosols/mitsubishi/mypass.htm>, 2 pages.

*SecureTouch PV—A Personal "Password Vault"* (visited Nov. 17, 1999) <http://www.biometricaccess.com/securetouch_pv.htm>, 1 page.

*Digital Descriptor Systems, Inc.-Profile* (visited Nov. 17, 1999) <http://www.ddsi-cpc.com/pages/profile.html>, 3 pages.

*Press Release: Printrak International Announces New Portable Fingerprint ID Solution*, Dec. 10, 1996, (visited Nov. 17, 1999) <http://www.scott.net/~dg/25.htm>, 3 pages.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (discusses technology as early as 1974).

Verifier™ 200 Fingerprint Capture Devices, Cross Match Technologies, Inc., 2 pages, 1996-1997.

Verifier 200 Direct Fingerprint Reader, Cross Check Corporation, 2 pages, 1996-1997.

Verifier™ 250 Fingerprint Capture Devices, Cross Match Technologies, Inc., 2 pages, 1996-1997.

Verifier 250 Small Footprint Direct Fingerprint Reader, Cross Check Corporation, 2 pages, 1996-1997.

Verifier™ 290 Fingerprint Capture Devices, Cross Match Technologies, Inc., 2 pages, 1996-1997.

Verifier 290 Direct Rolled Fingerprint Reader, Cross Check Corporation, 2 pages, 1996-1997.

Verifier™ 500 Fingerprint Capture Devices, Cross Match Technologies, Inc., 2 pages, 1998.

Biometric terminal, 1 page, date unknown (believed to be obtained before one year prior to Aug. 1, 2003).

10-Print Imaging Sysytem, Cross Check Corporation, 2 pages, 1998.

*Cross Match Technologies, Inc.* (visited Mar. 25, 1999) <http://www.crossmatch.net/>, 1 page.

*Cross Match Technologies, Inc.—Products Overview* (visited Mar. 25, 1999) <http://www.crossmatch.net/new/products/product-index.html>, 1 page.

*Cross Match Technologies, Inc.—Law Enforcement Systems* (visited Mar. 25, 1999) <http://www.crossmatch.net/new/law/law-index.html>, 2 pages.

*Cross Match Technologies, Inc.—Commercial Systems: Building On The Standard* (visited Mar. 25, 1999) <http://www.crossmatch.net/new/commercial/commercial-index.html>, 2 pages.

*Cross Match Technologies, Inc.—International Sales* (visited Mar. 25, 1999) <http://www.crossmatch.net/new/sales/sales-index.html>, 1 page.

*Cross Match Technologies, Inc.—Support* (visited Mar. 25, 1999) <http://www.crossmatch.net/new/support/support-index.html>, 1 page.

*Cross Match Technologies, Inc.—News—Press Releases—Verifier 400 Press Release* (visited Mar. 25, 1999) <http://www.crossmatch.net/new/news/news-pr-050798.html>, 1 page.

*Global Security Fingerscan™ System Overview* (visited Jan. 11, 2000) <http://wwwu-net.com/mbp/sol/g/a9.htm>, 12 pages.

"Command Structure for a Low-Cost (Primitive) Film Scanner," *IBM Technical Disclosure Bulletin*, IBM Corp., vol. 35, No. 7, Dec. 1992, pp. 113-121.

*Fingerprint Scan API Toolkit Version 1.x Feature List* (Apr. 26, 2000) <http://www.mentalix.com/api/archive_fapivl.htm>, 3 pages.

"Image Acquisition System," *IBM Technical Disclosure Bulletin*, IBM Corp., vol. 29, No. 5, Oct. 1986, pp. 1928-1931 (3 actual pages).

Kunzman, Adam J. and Wetzel, Alan T., "1394 High Performance Serial Bus: The Digital Interface for ATV," *IEEE Transactions on Consumer Electronics*, IEEE, vol. 41, No. 3, Aug. 1995, pp. 893-900.

*Mentalix Provides The First IAFIS-Certified Latent Print Scanning Solution For Windows®* (Jul. 23, 1999) <http://www.mentalix.com/pressreleases/fprintplook3_prel.htm>, 2 pages.

Sluijs, F. et al., "An On-chip USB-powered Three-Phase Up/down DC/DC Converter in a Standard 3.3V CMOS Process," *2000 IEEE International Solid-State Circuits Conference*, IEEE, Feb. 9, 2000, pp. 440-441.

Venot, A. et al., "Automated Comparison of Scintigraphic Images," *Journal of Nuclear Medicine*, vol. 27, No. 8, Aug. 1986, pp. 1337-1342.

English-language Abstract for Japanese Patent Publication No. 59-103474, published Jun. 14, 1984, printed from espacenet.com, 1 page.

English-language Abstract for Japanese Patent Publication No. 62-212892, published Sep. 18, 1987, printed from espacenet.com, 1 page.

English-language Abstract for Japanese Patent Publication No. 1-205392, published Aug. 17, 1989, printed from espacenet.com, 1 page.

English-language Abstract for Japanese Patent Publication No. 3-161884, published Jul. 11, 1991, printed from espacenet.com, 1 page.

English-language Abstract for Japanese Patent Publication No. 3-194674, published Aug. 26, 1991, printed from espacenet.com, 1 page.

English-language Abstract for Japanese Patent Publication No. 3-194675, published Aug. 26, 1991, printed from espacenet.com, 1 page.

English-language Abstract for Japanese Patent Publication No. 10-079017, published Mar. 24, 1998, printed from espacenet.com, 1 page.

English-language Abstract for Japanese Patent Publication No. 10-262071, published Sep. 29, 1998, printed from espacenet.com, 1 page.

English-language Abstract for Japanese Patent Publication No. 11-167630, published Jun. 22, 1999, printed from espacenet.com, 1 page.

English-language Abstract for Japanese Patent Publication No. 11-225272, published Aug. 17, 1999, printed from espacenet.com, 1 page.

English-language Abstract for Japanese Patent Publication No. 11-252489, published Sep. 17, 1999, printed from espacenet.com, 1 page.

English-language Abstract for Japanese Patent Publication No. 11-289421, published Oct. 19, 1999, printed from espacenet.com, 1 page.

*ID 1000™ 10-PrintLive Scan System*, Cross Match Technologies, Inc., Copyright 2000, 2 pages.

*ID 1000™ Portable Live Scan System*, Cross Match Technologies, Inc., Copyright 1999, 4 pages.

*ID 1500™ Palm Print Live Scan System*, Cross Match Technologies, Inc., Copyright 2000, 2 pages.

*Proposed National Plan—Flat Fingerprint Based Applicant Background Checks* (Draft), Public Safety Strategy Subcommittee, Jan. 21, 2001, p. 1-5 and A-1 through A-12.

Ratha, N.K. et al., "Fingerprint Image Quality Estimation," *IBM Research Report*, Dec. 1999, pp. 1-5.

International Search Report and Written Opinion, from PCT Appl. No. PCT/US2004/024416, filed Jul. 30, 2004, 13 pages, mailed Dec. 6, 2004.

English language Abstract of Japanese Patent Publication No. 63-137206 A, published Jun. 9, 1988, from the Japan Patent Office, 2 pages.

English translation of Russian Patent No. SU 1769854 A1, published Oct. 23, 1992, 3 pages.

\* cited by examiner

Annotate Missing or Damaged Fingers

One or more Fingers were not detected while scanning the LEFT hand slap. Please select which fingers were missing?

Missing or Damaged Fingers
- ☐ Index Finger
- ☐ Middle Finger
- ☐ Ring Finger
- ☐ Little Finger Annotation

[ OK ]  [ Cancel ]

FIG. 5

BIOMETRIC IMAGING CAPTURE SYSTEM AND METHOD

CROSS-REFERENCE TO RELATED APPLICATIONS

The present application is related to U.S. Provisional Patent Application No. 60/348,678, filed on Jan. 17, 2002, which is incorporated by reference herein in its entirety.

The present application is related to U.S. patent application Ser. No. 10/345,420 and U.S. patent application Ser. No. 10/345,366, both filed on Jan. 16, 2003, which are incorporated by reference herein in their entireties.

BACKGROUND OF THE INVENTION

1. Field of the Invention

The present invention is generally related to biometric imaging systems. More particularly, the present invention is related to the reliable obtainment of quality biometric print images.

2. Background Art

Biometrics is a science involving the analysis of biological characteristics. Print capture and recognition is an important biometric technology. Law enforcement, banking, voting, and other industries increasingly rely upon prints as a biometric to store, recognize or verify identity. See, e.g., Gary Roethenbaugh, "Biometrics Explained," International Computer Security Association, Inc., pp. 1-34 (1998), which is incorporated by reference herein in its entirety. Generally, a biometric is a measurable, physical characteristic or personal behavior trait used to recognize the identity, or verify the claimed identity, of a person who has a biometric reference template (e.g., data that represents a biometric measurement) on file.

There are a number of different types of biometric imaging systems. For example, one type of biometric imaging system is a print scanner (also called a live scanner). Print scanners often serve as input devices to an Automatic Fingerprint Identification System (AFIS). Automatic Fingerprint Identification Systems can be used for law enforcement purposes to collect print images from criminal suspects when they are arrested.

One type of print scanner is a ten-print scanner. Typically, ten-print scanners require each finger to be imaged using a roll print technique. A flat print technique or a slap print technique may also be used. Unfortunately, it is sometimes difficult to obtain quality prints because of the scanner timing or the awkward placement of the fingers. For example, an operator of an AFIS input device may have to reset the device and/or rescan every time a user does not place his or her fingers on a scanner platen correctly. Or, as an alternative example, the operator may have to reset the device and/or rescan every time a user does not get his or her fingers in place before the scanner captures an image. Poor print quality or incorrect placement can cause a set of captured prints to be rejected by an AFIS. The result of having to deal with such difficulties is that the process of obtaining prints, such as during an arrest or background check, becomes relatively complex and time-consuming.

Currently, biometric imaging systems lack the ability to reliably capture quality biometric print images. What is needed is a system and method of efficiently capturing biometric print images of good quality and integrity.

BRIEF SUMMARY OF THE INVENTION

Embodiments of the present invention provide a biometric imaging system and method that can reliably process and capture quality print images while ensuring data and print image integrity. The system and method can be used to capture print impressions as a single image and segment the single image to create separate images for further processing.

Embodiments of the present invention provide a method including the steps of initiating camera operation within a scanner, scanning a biometric object to obtain a scanned print image, processing the scanned image, determining the print quality of individual print images in the scanned image, detecting prints in the scanned image, and determining whether the scanned image is ready for capture based on an expected number of prints detected and the quality of those print images. The method includes capturing the scanned image, processing the captured image, and forwarding the captured image to a computer. The method further includes allowing an operator to annotate quality issues regarding the captured image, such as information about individual print images that are missing or of unacceptable quality. The method also includes timing out the scanner when no print images are detected and a predetermined scanner timeout period has expired.

Embodiments of the present invention provide a method including filtering a scanned image, binarizing the filtered image, detecting print area based on the binarized image, detecting print contrast based on the detected print area and the scanned image, detecting print shape based on the binarized image, and separating the print image into individual print images based on the print area, contrast, and shape detected. The method also includes determining print image quality of each individual print image based on minutiae data extracted from the individual print images, such as pattern detail.

Embodiments of the present invention provide a method including classifying each individual print image based on a predetermined quality threshold and indicating a quality classification of the individual print images to an operator.

Embodiments of the present invention provide a method including the use of a predetermined capture delay time period, quality time period, and scanner timeout period, which contribute to the effectiveness of the method.

Embodiments of the present invention are directed to a biometric print imaging system for reliably processing and capturing print images. The system includes means of providing the method steps in the aforementioned method embodiments.

Embodiments of the present invention are directed to a biometric print image scanner system that reliably captures print images. The system includes a scanner that scans print images of biometric objects. The scanner includes a print capture manager that determines when a scanned print image is ready for capture. The system also includes a computer that stores and displays data regarding the captured print images. The computer also allows an operator to input annotation regarding the captured print images. The system also includes a communication link between the computer and the scanner that allows the transfer of data regarding the captured print images.

Embodiments of the present invention include a scanner with a sensor that detects print images, an output device that displays to an operator information regarding the scanned print images, and a controller that controls interoperation of the sensor, the print capture manager, and the output device.

The sensor includes a platen that receives biometric objects, such as fingers or thumbs, and a camera that scans print images of the biometric objects. The output device includes individual quality indicators for individual print images. The individual quality indicators are areas of a liquid crystal display (LCD) highlighted by symbols, shades, or colors that represent a quality classification of each individual print image.

Embodiments of the present invention include a computer that includes a memory that stores data regarding captured print images. The computer also includes an operator interface that displays to an operator the captured print image data and allows an operator to input annotation regarding the captured print images. The operator interface includes a monitor on which an operator can view captured print image information and an input device from which an operator can input annotation.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art(s) to make and use the invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

Sections
    Terminology
    The Biometric Imaging System
    Real-Time Feedback Quality Indicators
    Method of Processing and Capturing Print Images
    Conclusion Terminology To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "print image" refers to any of the various types of image data representing the print, which may include, but is not limited to, grey scale data, binary data, or any other type of raw or processed image data.

The term "biometric data" or "biometric information" throughout the specification can be any data representative of a biometric, a digital or other image of a biometric (e.g., a bitmap or other file), extracted digital or other information relating to the biometric (e.g., a template based on minutiae detail), etc. The data may refer to print boundaries, contrast, or ridge patterns, for example.

The term "minutiae" includes unique and measurable physical characteristics of a print. For fingerprints, minutiae include the starting and ending point of ridges and ridge junctions among features.

The term "scan" refers to the taking of any type of print image by a print scanner. A scan can include, but is not limited to, a scan of a finger, a finger roll, a flat finger, slap print of four fingers, thumb print, palm print, or a combination of fingers, such as, sets of fingers and/or thumbs from one or more hands or one or more palms disposed on a platen.

In a scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A platen can be movable or stationary depending upon the particular type of scanner and the type of print being captured by the scanner.

The terms "biometric imaging system," "scanner," "fingerprint scanner," and "print scanner" are used interchangeably, and refer to any type of scanner which can obtain an image of all or part of one or more fingers, palms, toes, foot, hand, etc. in a live scan. The obtained images can be combined in any format including, but not limited to, a Federal Bureau of Investigation (FBI), state, or international ten-print format.

The Biometric Imaging System

Embodiments of the present invention provide a biometric imaging system and method. Although ten-print capture and four finger slap capture are the preferred system and method described throughout the specification and/or claims, it is to be appreciated that any available number of fingers and/or thumbs are also contemplated within the scope of the present invention. Thus, even when the above terminology is used, it can include less fingers and/or thumbs. In addition, it is to be appreciated that other biometric objects having prints are also contemplated within the scope of the present invention, including palms, hand, toes, foot, etc.

The biometric imaging system can provide a simplified way to reliably capture biometric image prints. For example, fingerprints can be captured by allowing four finger slap impressions to be captured in a single image. A simultaneous impression of the four fingers from one hand captured as a single image can then be segmented to create up to four separate images. After the fingerprints from the fingers from both hands are captured, thumb prints from both hands can be captured simultaneously. Each individual extracted image can then be placed within the corresponding finger and/or thumb print box on a fingerprint card to save for future identification or verification purposes. Examples of such processes for print capture and separation are further described in U.S. patent application Ser. No. 10/345,420 and U.S. patent application Ser. No. 10/345,366, which are incorporated by reference herein in their entireties.

Proper sequencing of the placement of biometric objects (e.g., finger and/or thumb prints) can be performed using software analysis and/or physical properties of a platen. The platen may also include a finger guide to help physically divide digits. This process is further described in U.S. patent application Ser. No. 10/345,420 and U.S. patent application Ser. No. 10/345,366, which are incorporated by reference herein in their entireties.

Biometric print images can be presented on a screen, such as a monitor coupled to a personal computer, to provide real time quality checks and assistance with correction. This is further described with reference to FIGS. 1A, 1B, and 2.

Figure 1A:
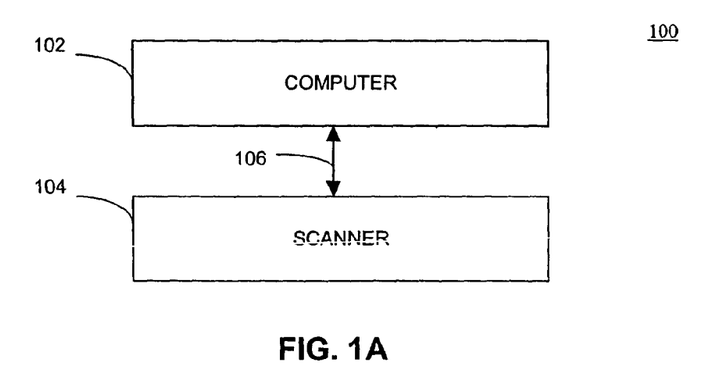
FIG. 1A shows an exemplary biometric imaging system according to an embodiment of the present invention.

FIG. 1A is a high level block diagram illustrating a biometric imaging system 100 according to one embodiment of the present invention. Biometric imaging system 100 includes a computer 102, a scanner 104, and an interface link 106. In one embodiment, interface link 106 is a 1394 serial interface bus that couples scanner 104 to computer 102. The 1394 is an IEEE standard for a high performance serial bus designed to provide high speed data transfers. The 1394 is a cost-effective way to share real-time information from data intensive applications, such as cameras, camcorders, VCRs, video disks, scanners, etc. The present invention is not limited to a 1394 interface. Any type of interface can be used to couple scanner 104 and computer 102. Communications over interface link 106 can be one or two-way communications.

Computer 102 may be any commercial off-the-shelf computer. For example, computer 102 may be a personal computer (PC). An example implementation of computer 102 is described in U.S. patent application Ser. No. 10/345,420 and U.S. patent application Ser. No. 10/345,366, which are incorporated by reference herein in their entireties. After reading this description, it will be apparent to a person skilled in the relevant art how to implement the invention using other computer systems and/or computer architectures.

Computer 102 includes a memory 110. Memory 110 is preferably random access memory (RAM), however other types of memory may be used, such as a hard disk drive, or removable storage units such as a floppy disk, a magnetic tape, an optical disk, etc. Removable storage units are read by and written to by removable storage drives. As will be appreciated, a hard disk drive and a removable storage unit may each include a computer usable storage medium having stored therein computer software and/or data.

Figure 1B:
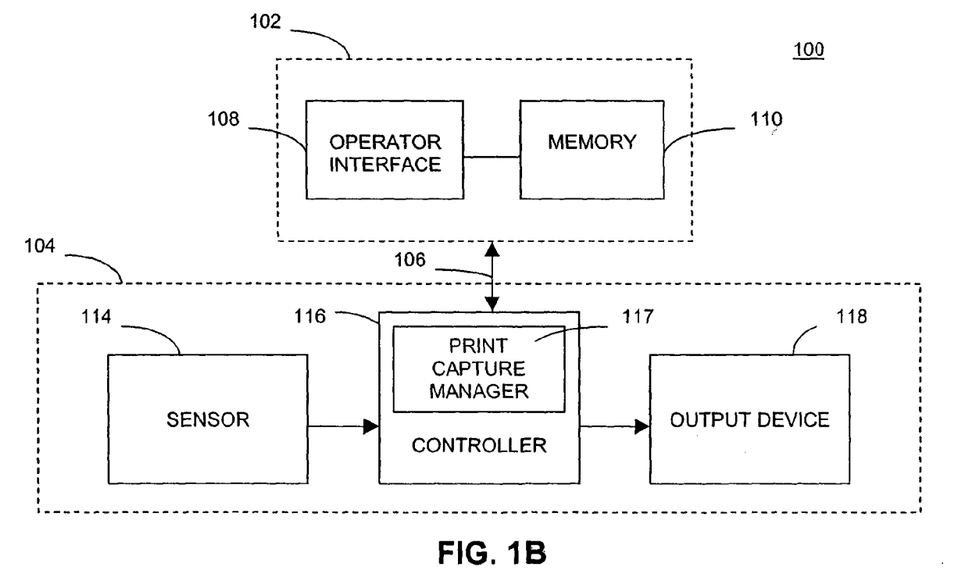
FIG. 1B shows the exemplary biometric imaging system of FIG. 1A in more detail.

Referring to FIG. 1B, computer programs (not shown) (also called computer control logic or software) are stored in memory 110. Such computer programs, when executed, enable computer 102 to perform one or more of the features of the present invention as discussed herein. Accordingly, such computer programs represent controllers of computer 102. In particular, a computer program, when executed, enables an operator interface 108 that allows an operator to enter annotation associated with a captured biometric print image that computer 102 receives from scanner 104. This is herein described in more detail with reference to FIG. 5. As will be apparent to a person skilled in the relevant art, embodiments of the present invention may also be implemented primarily in hardware or as a combination of both hardware and software.

In an embodiment of the present invention, operator interface 108 includes a monitor (not shown) and input device (e.g., a keyboard and/or mouse) (not shown). For example, the monitor is used to provide real-time feedback to an operator with regard to current captured biometric print images. In addition, the input device is used by the operator to input annotation with regard to captured biometric print images.

In an embodiment of the present invention, scanner 104 includes a sensor 114, a controller 116, and an output device 118. Controller 116 includes print capture manager 117. Scanner 104 illuminates an area of a platen (not shown) for receiving one or more fingers. In an embodiment, sensor 114 is a camera such as a digital camera. Sensor 114 detects print images of prints placed on the platen. Controller 116 controls the interoperation of sensor 114, print capture manager 117, and output device 118. Print capture manager 117 captures print images in an embodiment of the present invention as described further below with respect to FIGS. 3A-3C. The fingerprint image and any associated information regarding the fingerprint image can be forwarded from scanner 104 to computer 102. Similarly, information or feedback regarding the fingerprint image can be forwarded to output device 118 for display to an operator.

Control functionality described above, including all or part of the functionality of print capture manager 117, can be carried out by a scanner, such as a ten-print scanner, a computer coupled to the scanner, or distributed between both the scanner and the computer. Embodiments of the system have been described above with regard to a camera, including but not limited to a digital camera. This is not intended to limit the present invention because any type of sensor, detector, or camera can be used to scan and capture a print image as is known in the art.

Real-Time Feedback Quality Indicators

Figure 2:
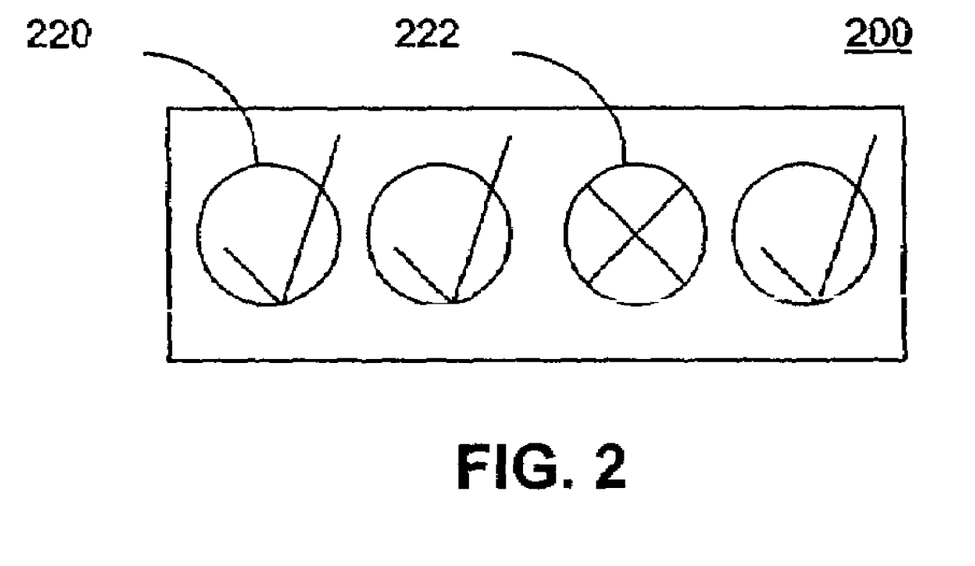
FIG. 2 shows print image quality indicators according to an embodiment of the present invention.

In one embodiment of the present invention, output device 118 indicates the quality of a biometric print image. This feedback is provided in real-time by the system with every image scanned. For example, output device 118 could include one or more quality indicators, perhaps with each quality indicator associated with a specific finger of a four-slap fingerprint image. In one embodiment of the invention, output device 118 includes one or more indicators comprising light-emitting diodes (LEDs). In another embodiment, the indicators are multi-color LEDs. In that embodiment, a red LED may indicate poor quality, a green LED may indicate acceptable quality, and an amber LED may indicate possibly acceptable quality. In another embodiment, the indicators are bar graph LED indicators, wherein the level of the bar indicates quality acceptance. In still further embodiments, the indicators are any electrical, mechanical, or audio device or signal known to alert a user of a condition, as would be known to one skilled in the art. In one embodiment, different symbols are used on a liquid crystal display (LCD) to indicate quality level, as depicted in FIG. 2. Quality indicator field 200 provides quality indicators for up to four fingers of a four-slap print image. Indicator 220 shows, by a checkmark, that the image of the finger associated with indicator 220 is of good quality. Similarly, indicator 222 shows, by an "X" that the image of the finger associated with indicator 222 is not of good quality. This embodiment is further described below with reference to FIGS. 4A and 4B. It is appreciated that other symbols, as well as other indicators such as colors, shades, shapes, or words, can be used to denote quality levels.

Figure 4A:
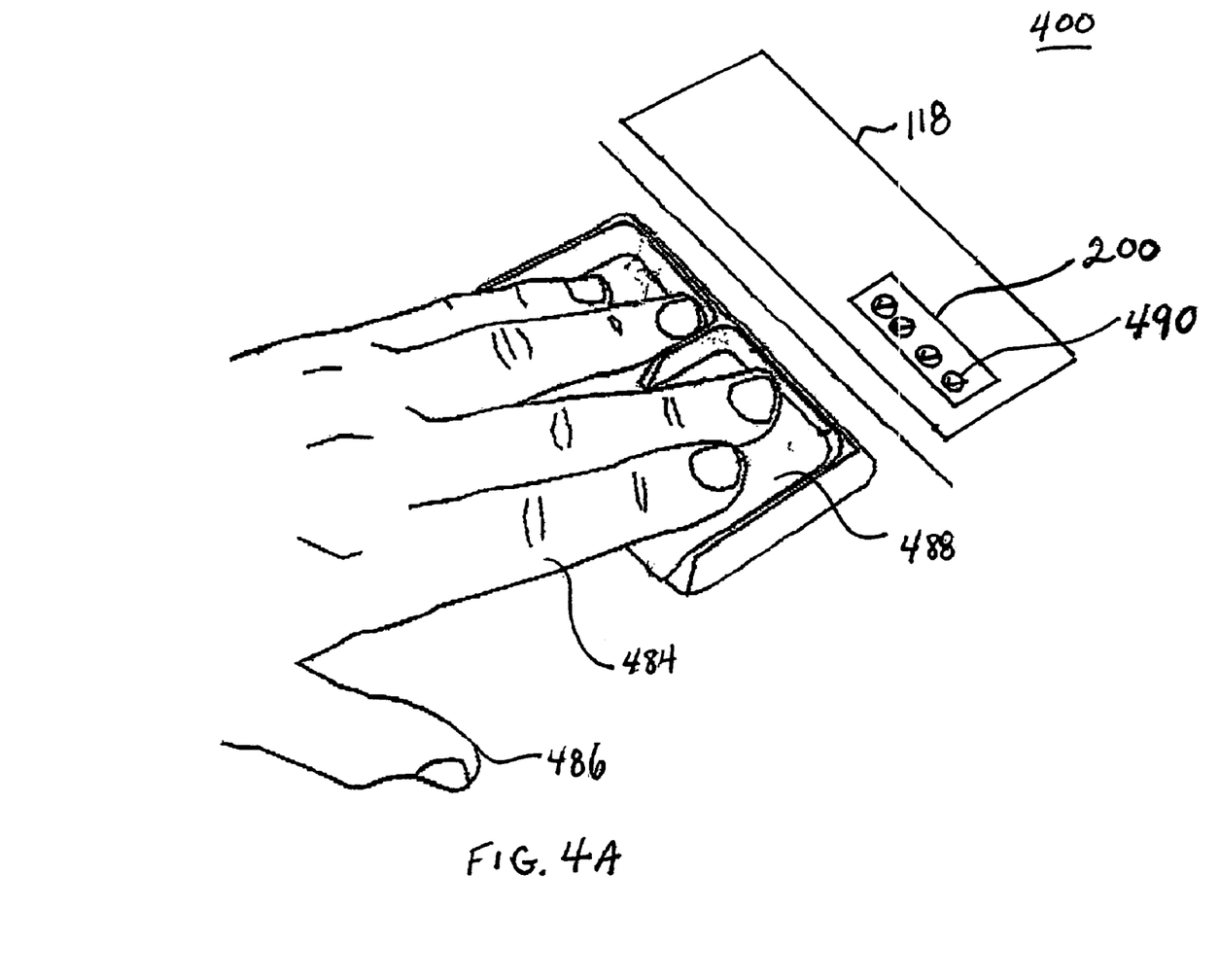
FIG. 4A shows a portion of a ten-print scanner as is used in an embodiment of the present invention, indicating feedback that all print images are of good quality.
Figure 4B:
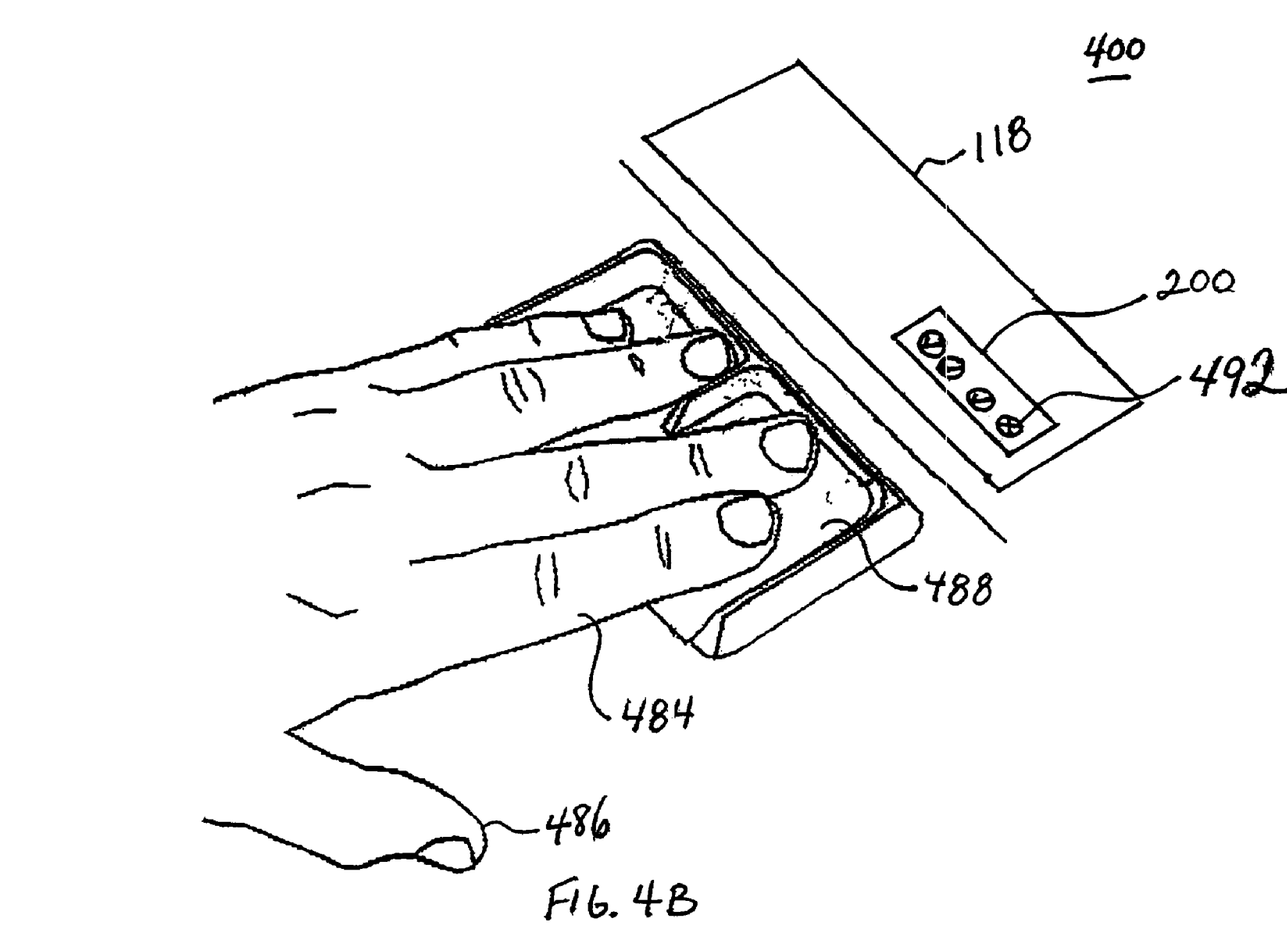
FIG. 4B shows a portion of a ten-print scanner as is used in an embodiment of the present invention, indicating feedback that one print image is not of good quality.

FIG. 4A shows a portion of a ten-print scanner 400. To use ten-print scanner 400, a user places his or her fingers 484 or thumbs 486 upon a platen 488. Scanner 104 then illuminates an area of platen 488, collects information from that area of platen 488, and converts the collected information into a fingerprint image. The collected information is based on light reflected off platen 488. Scanning occurs repeatedly, typically on the order of once every millisecond or less. An indicator field 200 on output device 118 provides real-time feedback for each image scanned. For example, in FIG. 4A, indicator field 200 is a portion of an LCD screen on scanner 104. In FIG. 4A, all four indicators 490, each associated with an individual finger 484, are checkmarks indicating that the individual print image of each finger 484 is of good quality. Contrastingly, in FIG. 4B, indicator 492 associated with pointer finger 484 is an "X," indicating that the print image of pointer finger 484 is not of good quality. In this way, indicator field 200 is very useful to an operator of scanner 104 in that the operator can immediately determine if the fingers 484 need adjusted placement on platen 488 to obtain a quality print image.

Quality indications can also be displayed at a separate display on the biometric imaging system. For example, an external computer 102 can output a variety of displays on a monitor indicating quality of print images.

Method of Processing and Capturing Print Images

Figure 3A:
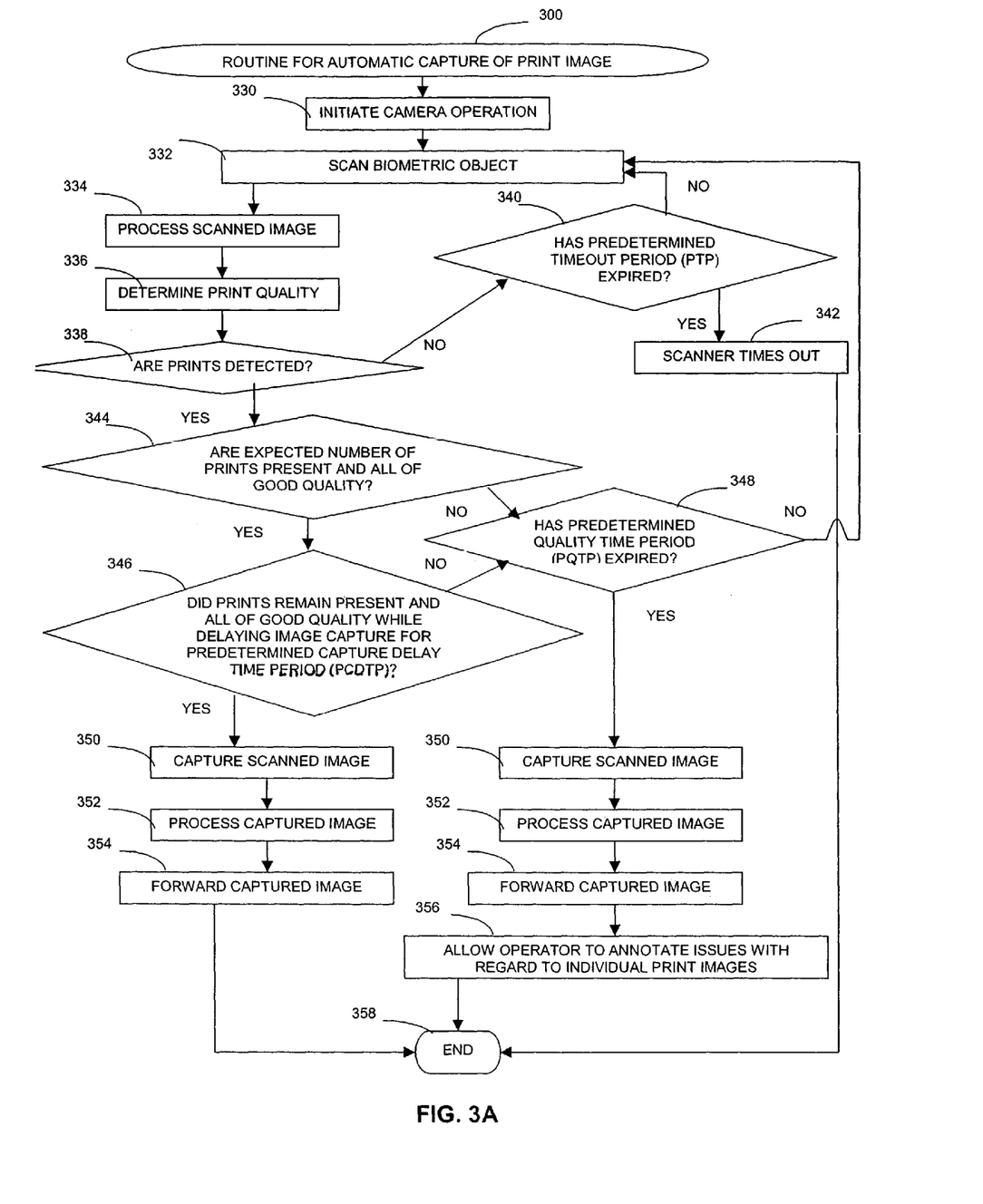
FIG. 3A shows a routine for the capture of biometric print images according to an embodiment of the present invention.

FIG. 3A describes a routine 300 for capture of biometric print images according to an embodiment of the present invention (steps 330-358). For convenience, routine 300 is described with reference to imaging system 100, and in particular to print capture manager 117. However, routine 300 is not intended to be limited to this embodiment or structure. In step 330, print capture manager 117 initiates camera operation within scanner 104. In step 332, a biometric object is scanned to obtain a scanned print image. Print capture manager 117 processes each scanned image (step 334), and outputs a real-time quality indication to the operator (step 336). The processing step 334 and the quality indication step 336 are described further in reference to FIGS. 3B and 3C, respectively. The real-time quality indication is also described earlier herein with reference to FIGS. 4A and 4B.

If in step 338, print capture manager 117 detects no prints, and has not detected any prints during a predetermined timeout period in step 340, then print capture manager 117 issues a control signal timeout to scanner 104 in step 342, and routine 300 ends at step 358. The purpose of the predetermined timeout period is to time out scanner 104 if it is determined that no prints were detected during that amount of time. For example, if an operator initiates imaging system 100, but no one places fingers on the platen for the predetermined timeout period, then scanner 104 times out. Alternatively, if a user places fingers on the platen for scanning, but subsequently removes them, and they remain removed for the predetermined timeout period, scanner 104 times out. In an embodiment of the present invention, the predetermined timeout period is sixty seconds. However, the predetermined timeout period is adjustable. A scanner timeout typically entails the stoppage of camera operation. If no prints are detected in step 338, and the predetermined timeout period in step 340 has not expired, then the routine returns to step 332 to scan the biometric object to obtain a subsequent print image.

In an embodiment of the present invention, print capture manager 117 expects four prints for a four finger slap image or expects two prints for an image of the thumbs. If prints are detected in step 338, then print capture manager 117 determines whether the scanned image is ready for capture based on the expected number of prints and the quality of the scanned print images. If not all expected prints are present within the scanned print image, or if not all of the expected prints are of good quality, then the routine continues at step 348.

In step 348, print capture manager 117 determines whether a predetermined quality time period has expired. In an embodiment of the present invention, the predetermined quality time period is five seconds. However, the predetermined quality time period is adjustable. For example, in an embodiment of the invention, if not all expected prints are present within the scanned print image, or if not all of the expected prints are of good quality, then the system determines whether it has been attempting to capture this set of prints for a predetermined quality time period of five seconds. If the predetermined quality time period has not expired in step 348, then the routine returns to step 332 to scan the biometric object to obtain a subsequent print image. If, on the other hand, in step 348, imaging system 100 determines that the predetermined quality time period has expired, the routine continues at step 350.

Figure 5:
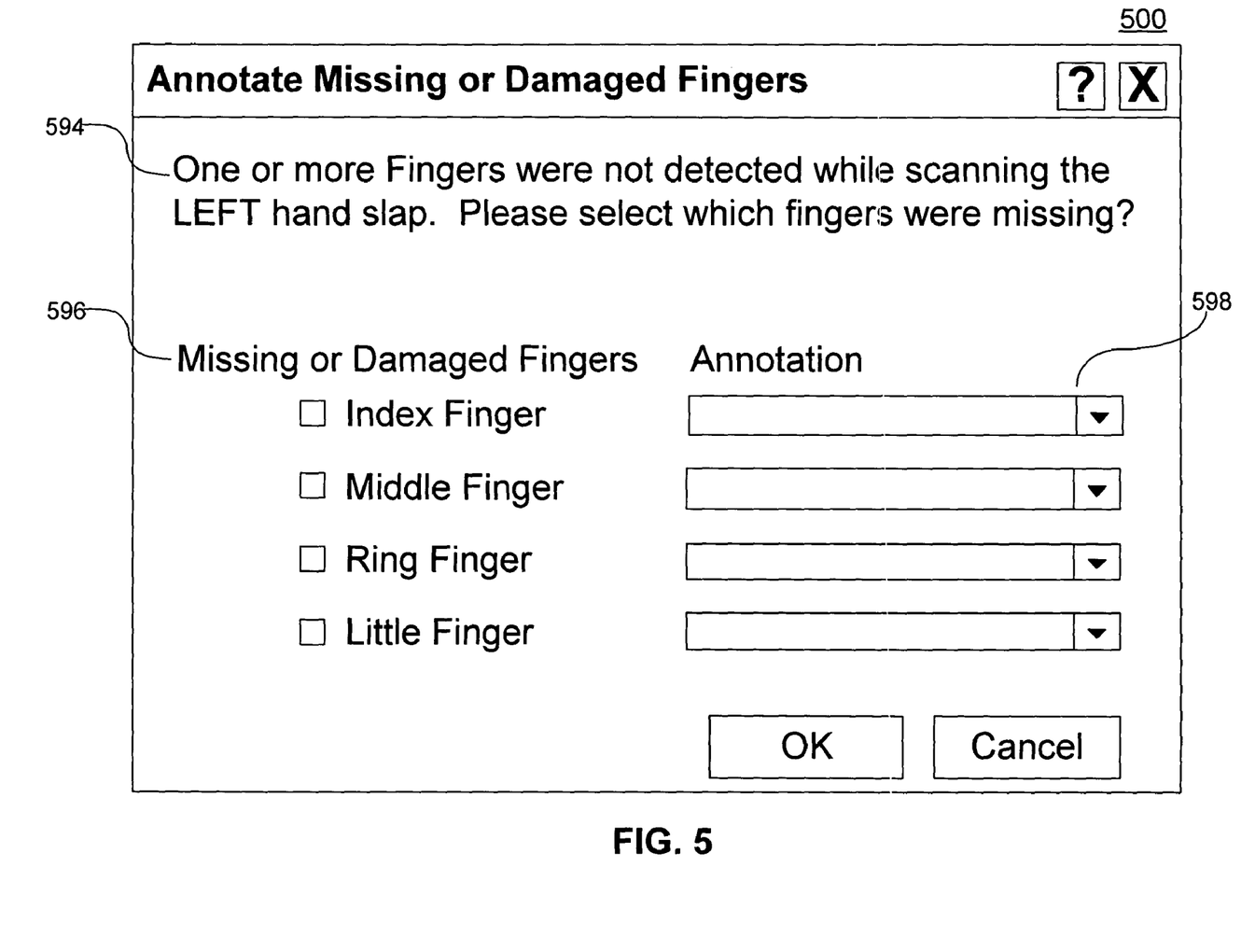
FIG. 5 shows an operator interface screen through which an operator can provide annotation regarding individual print images.

In step 350, the latest scanned print image is captured. In step 352, the captured image is processed. The processing step 352 is herein further described later in reference to FIG. 3D. In step 354, the captured image is forwarded. In an embodiment of the present invention, the captured image is forwarded to computer 102 for further processing and storage in memory 110 as herein described earlier with reference to FIGS. 1A and 1B. For example, in the next step 356, an operator is given the opportunity to annotate issues with regard to individual print images. In an embodiment, this annotation is done through an operator interface 108 of computer 102. FIG. 5 shows an example annotation screen 500, according to an embodiment of the present invention. Statement 594 describes a print quality issue requiring operator comment. Checkboxes 596 allow the operator to denote which finger requires further comment. The operator is then given the opportunity to comment in annotation fields 598. Referring back to FIG. 3A, after the operator is given the opportunity to annotate issues with regard to individual print images in step 356, routine 300 ends at step 358.

Referring again to step 344, if all expected prints are present within the scanned image and are all of good quality, then print capture manager 117 determines at step 346 whether the prints remained in this state for a predetermined capture delay time period. In an embodiment of the present invention, the predetermined capture delay time period is one half second. However, the predetermined capture delay time period is adjustable. If in step 346 the prints remained in this state for a predetermined capture delay time period, then the routine continues at step 350. In step 350, the latest scanned image is captured. In step 352, the captured image is processed. The processing step 352 is herein further described later in reference to FIG. 3D. In step 354, the captured image is forwarded. In an embodiment of the present invention, the captured image is forwarded to computer 102 for further processing and storage in memory 110 as herein described earlier with reference to FIGS. 1A and 1B. The routine then ends at step 358.

Referring again to step 346, if the expected prints do not remain present or if they do not all remain in good quality for the predetermined capture delay time period, then the routine continues at step 348. Step 348 is described earlier herein.

Figure 3B:
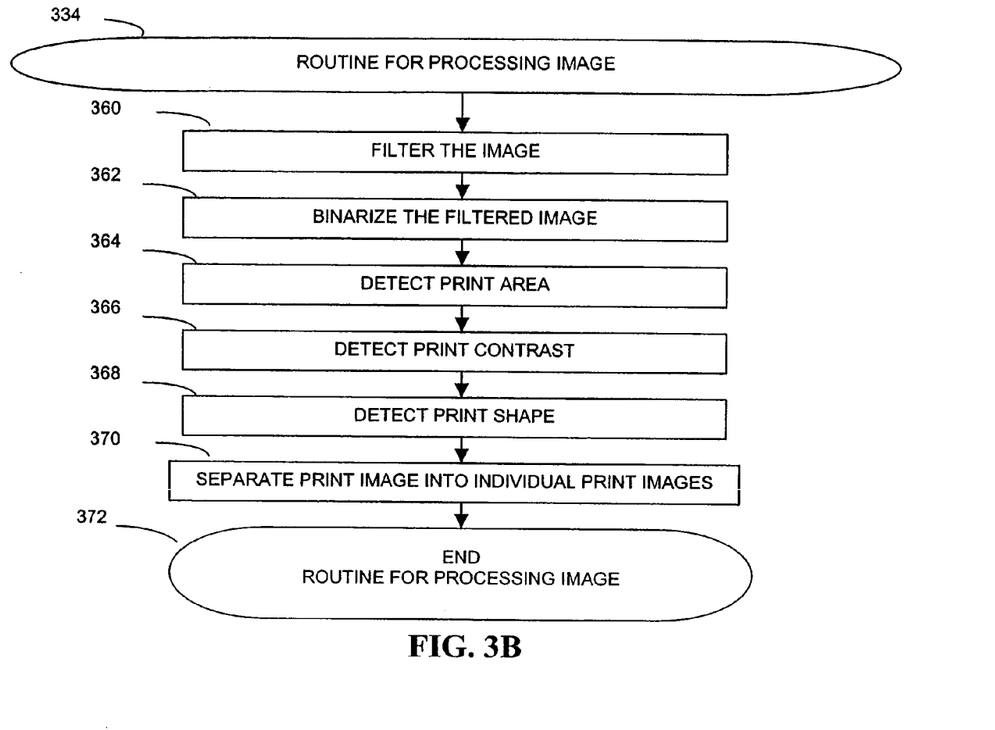
FIG. 3B shows a routine of processing an image according to an embodiment of the present invention.

FIG. 3B further describes processing scanned image step 334, starting immediately with step 360. In step 360, the scanned image is filtered to remove all high frequency content, which corresponds to ridge and valley transitions of a finger. Thus, the scanned fingerprint image is filtered to remove all of the ridge and valley transitions to indicate the outlying of the fingerprint area.

In step 362, a binarization process is performed. The binarization process removes all of the grey areas and replace them with either black or white pixels based on a black and white threshold point. In one embodiment, the binarization process begins by taking an average grey scale value of the filtered image. In this instance, the average grey scale value is the black and white threshold point. In this embodiment, all of the pixel values above the average value are replaced with white pixels and all the pixel values equal to and below the average value are replaced with black pixels. The resulting image is comprised of all black and white pixels that define a print area, contrast, and shape.

In step 364, a print area is detected. Usually, the black areas of the image are concentrated around the prints. Thus, the detection step detects the areas concentrated by black pixels. In step 366, the print contrast is detected. Print contrast is further evidence of print area. For example, if the contrast is found to be low, that area of low contrast may not even be associated with the print image. In step 368, print shapes are detected. For example, fingerprint shapes can be oval-like shapes. In the print shape detection step, the areas concentrated by black pixels that are comprised of oval-like shapes are detected. In step 370, the print image is separated into individual print images based on the print area, contrast, and shape detected. Step 372 ends the routine for processing the scanned image and allows the calling routine to continue where it left off.

Figure 3C:
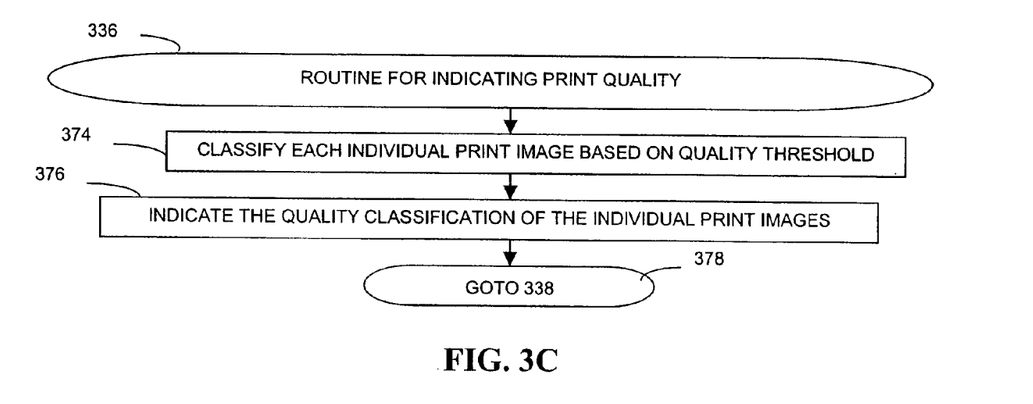
FIG. 3C shows a routine of indicating print image quality according to an embodiment of the present invention.

FIG. 3C further describes print quality indication step 336, starting immediately with step 374. In step 374, each individual print image is classified based on a predetermined quality threshold. It is to be appreciated that quality threshold levels are changeable and may be based on customer requirements. For example, one customer's requirements may be to set the acceptable quality threshold at 90% and the unacceptable quality threshold at 10%. Another customer's requirements may not be as stringent, only requiring the acceptable quality threshold to be at 80% and the unacceptable quality threshold to be at 20%. In an embodiment of the present invention, the quality classification includes acceptable (i.e., good) or not acceptable. In step 376, the quality classification of each individual print image is indicated in real-time to the operator. The real-time quality indication is also described earlier herein with reference to FIGS. 4A and 4B. In step 378, the routine continues with step 338, described earlier herein.

Figure 3D:
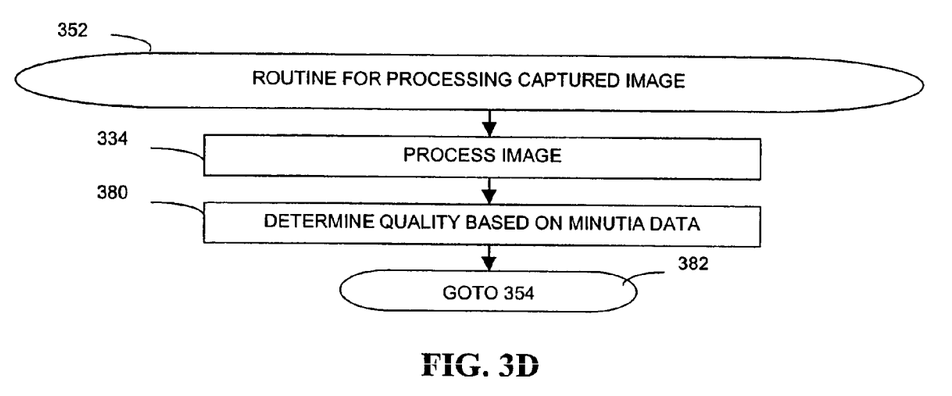
FIG. 3D shows a routine of processing a captured image according to an embodiment of the present invention.

FIG. 3D further describes processing captured image step 352, starting immediately with step 334. In step 334, the process is identical to that of processing the scanned image as described above with reference to FIG. 3B. The routine then continues with step 380. In step 380, a quality determination is made based on minutiae data extracted from the individual print images. The term 'minutiae' refers to unique and mearsurable characteristics of a print, including the starting and ending points of ridges and ridge junctions among features. In step 382, the routine continues with step 354, described earlier herein.

As described earlier with reference to step 354 in FIG. 3A, in an embodiment of the present invention, a captured image is forwarded to computer 102 for further processing and storage in memory 110 as described earlier with reference to FIGS. 1A and 1B. In an embodiment, further processing includes properly sequencing each individual print. For example, during the fingerprinting of a person, such as a criminal suspect, after a four finger slap and thumb print set for each hand is captured, the system asks for each finger to be separately scanned again in a roll print. The system asks for each finger in a specific order and compares each roll print with the corresponding individual print image of the slap print image previously obtained to ensure that it is the correct finger. If it is not the correct finger, the operator will be asked to make the correction. This sequencing technique allows for the proper placement of each fingerprint on a fingerprint card, for example. In this way, the fingerprint data maintains not only its quality, but also its integrity, and can then be easily used by authorities such as the FBI or similar agency for identification or verification purposes.

CONCLUSION

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for reliably capturing print images, comprising:
   (a) initiating camera operation within a scanner;
   (b) scanning a biometric object to obtain a scanned image;
   (c) processing the scanned image;
   (d) determining print quality of individual print images in the scanned image;
   (e) detecting prints in the scanned image; and (f) determining whether the scanned image is ready for capture based on an expected number of prints detected in step (e) and the quality of the print images determined in step (d).

2. The method of claim 1, wherein the processing step (c) comprises:
 (c1) filtering the scanned image;
 (c2) binarizing the filtered image to obtain a binarized image;
 (c3) detecting a print area based on the binarized image;
 (c4) detecting print contrast based on the print area detected in step (c3) and the scanned image;
 (c5) detecting a print shape based on the binarized image; and
 (c6) separating the binarized image into individual print images based on the print area, contrast, and shape detected.

3. The method of claim 2, wherein the determining print quality step (d) comprises:
 (d1) classifying each individual print image based on a predetermined quality threshold; and
 (d2) indicating a quality classification of the individual print images based on the classifying step.

4. The method of claim 2, further comprising
 (g) capturing the scanned image to obtain a captured image;
 (h) processing the captured image;
 (i) forwarding the captured image to a computer; and
 (j) allowing an operator to annotate quality issues regarding the individual print images,
 when the determining step (f) determines at least one of the following conditions:
  that the expected number of prints is not present within the scanned image, and
  that the expected prints are not all of good quality, and a predetermined quality time period has expired.

5. The method of claim 1, further comprising:
 (g) scanning the biometric object to obtain a subsequent scanned image;
 (h) processing the scanned image;
 (i) determining print quality of individual print images in the scanned image;
 (j) detecting prints in the scanned image; and
 (k) determining whether the scanned image is ready for capture based on an expected number of prints detected in step (j) and the quality of the prints determined in step (i),
 when the detecting step (e) determines that no prints are detected, and a predetermined timeout period has not expired.

6. The method of claim 1, further comprising timing out the scanner when the detecting step (e) determines that no prints are detected, and a predetermined timeout period has expired.

7. The method of claim 1, further comprising:
 (g) scanning the biometric object to obtain a subsequent scanned image;
 (h) processing the scanned image;
 (i) determining print quality of individual print images in the scanned image;
 (j) detecting prints in the scanned image; and
 (k) determining whether the scanned image is ready for capture based on an expected number of prints detected in step (j) and the quality of the print images determined in step (i),
 when determining step (f) determines at least one of the following conditions:
  that the expected number of prints is not present within the scanned image, and
  that the expected prints are not all of good quality, and a predetermined quality time period has not expired.

8. The method of claim 1, further comprising:
 (g) capturing the scanned image to obtain a captured image;
 (h) processing the captured image; and
 (i) forwarding the captured image to a computer,
 when the determining step (f) determines at least one of the following conditions:
  that the expected number of prints is not present within the scanned image, and
  that the expected prints are not all of good quality, and a predetermined quality time period has expired.

9. The method of claim 8, further comprising:
 (j) allowing an operator to annotate quality issues regarding the captured image.

10. The method of claim 8, wherein the processing the captured image step (h) comprises:
 (h1) filtering the captured image;
 (h2) binarizing the filtered image to obtain a binarized captured image;
 (h3) detecting a print area based on the binarized captured image;
 (h4) detecting print contrast based on the print area detected in step (h3) and the captured image;
 (h5) detecting a print shape based on the binarized captured image; and
 (h6) separating the binarized captured image into individual print images based on the print area, contrast, and shape detected.

11. The method of claim 10, further comprising:
 (h7) determining print image quality of each individual print image based on minutiae data extracted from the individual print images.

12. The method of claim 1, wherein when the determining step (f) determines that a state exists where the expected number of prints is present within the scanned image and that the expected prints are all of good quality, further comprising determining whether the state changes during a predetermined capture delay time period.

13. The method of claim 12, further comprising:
 (g) capturing the scanned image to obtain a captured image;
 (h) processing the captured image; and
 (i) forwarding the captured image to a computer,
 when the state does not change during a predetermined capture delay time period.

14. The method of claim 12, further comprising:
 (g) scanning the biometric object to obtain a subsequent scanned image;
 (h) processing the scanned image;
 (i) determining print quality of individual print images in the scanned image;
 (j) detecting prints in the scanned image; and
 (k) determining whether the scanned image is ready for capture based on an expected number of prints detected in step (j) and the quality of the print images determined in step (i),
 when the state does change during a predetermined capture delay time period, and a predetermined quality time period has not expired.

15. The method of claim 12, further comprising:
(g) capturing the scanned image to obtain a captured image;
(h) processing the captured image; and
(i) forwarding the captured image to a computer,
when the state does change during a predetermined capture delay time period, and a predetermined quality time period has expired.

16. The method of claim 15, further comprising:
(j) allowing an operator to annotate quality issues regarding the captured image.

17. A system for reliably capturing print images, comprising:
a scanner that scans print images, the scanner including a print capture manager, wherein the print capture manager determines that a scanned image is ready for capture when, within a predetermined capture delay time period, an expected number of prints is present within the scanned image and the expected prints are all of good quality;
a computer that stores and displays data regarding the captured print images and allows an operator to input annotation regarding the captured print images; and
a communication link between the computer and the scanner that allows the transfer of data regarding the captured print images.

18. The system of claim 17, wherein the print capture manager determines that a scanned image is ready for capture when the expected number of prints is not present within the scanned image, or the expected prints are not all of good quality, and a predetermined quality time period has expired.

19. The system of claim 17, wherein the scanner comprises:
a sensor that detects print images via scanning;
an output device that displays to an operator information regarding the scanned images; and
a controller that controls interoperation of the sensor, the print capture manager, and the output device.

20. The system of claim 19, wherein the sensor comprises:
a platen that receives biometric objects; and
a camera that scans print images of the biometric objects.

21. The system of claim 19, wherein the output device comprises individual quality indicators for individual print images.

22. The system of claim 21, wherein the individual indicators are areas of a liquid crystal display (LCD) highlighted by symbols that represent a quality classification of each image.

23. The system of claim 21, wherein the individual indicators are areas of a liquid crystal display (LCD) highlighted by shades or colors that represent a quality classification of each image.

24. The system of claim 17, wherein the computer comprises:
a memory that stores data regarding the captured print images; and
an operator interface that displays to an operator the captured print image data and allows an operator to input annotation regarding the captured print images.

25. The system of claim 24, wherein the operator interface comprises:
a monitor on which an operator can view the captured print image information; and
an input device from which an operator can input annotation.

26. A system for reliably capturing print images, comprising:
means for initiating camera operation within a scanner;
means for scanning a biometric object to obtain a scanned image;
means for processing the scanned image;
means for determining print quality of individual print images in the scanned image;
means for detecting prints in the scanned image; and
means for determining whether the scanned image is ready for capture, wherein the scanned image is ready for capture when at least one of the following conditions is satisfied:
the expected number of prints is present within the scanned image and the expected prints are all of good quality, within a predetermined capture delay time period; and
the expected number of prints is not present within the scanned image, or the expected prints are not all of good quality, and a predetermined quality time period has expired.

27. The system of claim 26, further comprising:
means for timing out the scanner when no prints are detected and a predetermined timeout period has expired.

28. The system of claim 26, further comprising:
means for capturing the scanned image to obtain a captured image;
means for processing the captured image; and
means for forwarding the captured image to a computer, when it is determined that the scanned image is ready for capture.

29. The system of claim 28, further comprising:
means for allowing an operator to annotate quality issues regarding the captured image,
when some but not all expected prints are detected, or when all expected prints are present in the captured image and in good quality but do not remain present or in good quality for a predetermined capture delay time period, and a predetermined quality time period has expired.

30. A method for reliably capturing print images, comprising:
(a) initiating camera operation within a scanner;
(b) scanning a biometric object to obtain a scanned image;
(c) processing the scanned image;
(d) determining print quality of individual print images in the scanned image;
(e) detecting prints in the scanned image; and
(f) determining whether the scanned image is ready for capture based on an expected number of prints detected in step (e) and the quality of the print images determined in step (d), wherein the scanned image is ready for capture when the expected number of prints is present within the scanned image and the expected prints are all of good quality within a predetermined capture delay time period.

31. The method of claim 30, further comprising:
(g) determining that the scanned image is ready for capture when the expected number of prints is not present within the scanned image, or the expected prints are not all of good quality, and a predetermined quality time period has expired.

* * * * *